Dec. 18, 1934.   J. T. LAWRENCE   1,985,177
COLLAPSIBLE FISH BASKET
Filed Nov. 10, 1932   2 Sheets-Sheet 1
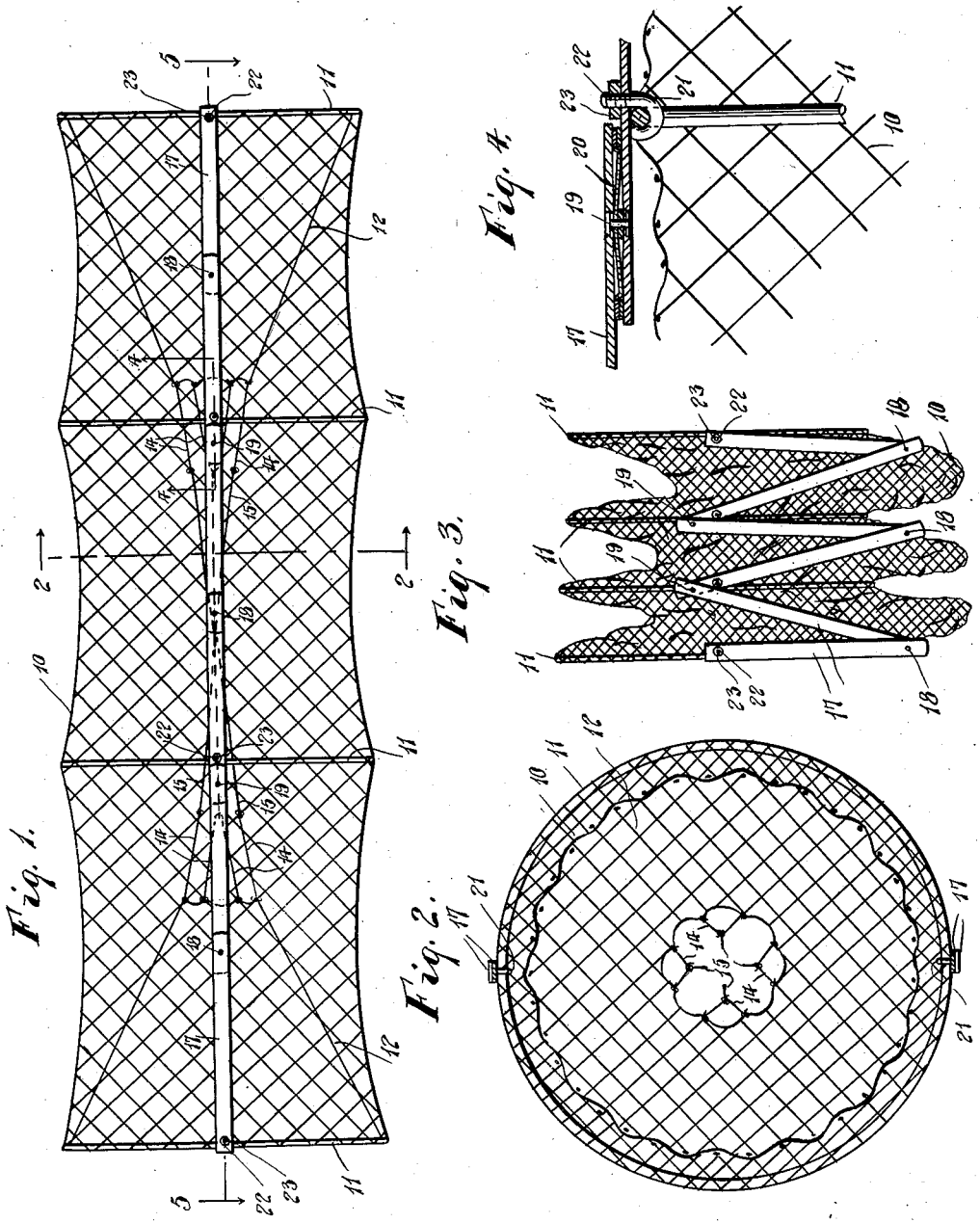

Dec. 18, 1934.   J. T. LAWRENCE   1,985,177
COLLAPSIBLE FISH BASKET
Filed Nov. 10, 1932   2 Sheets-Sheet 2
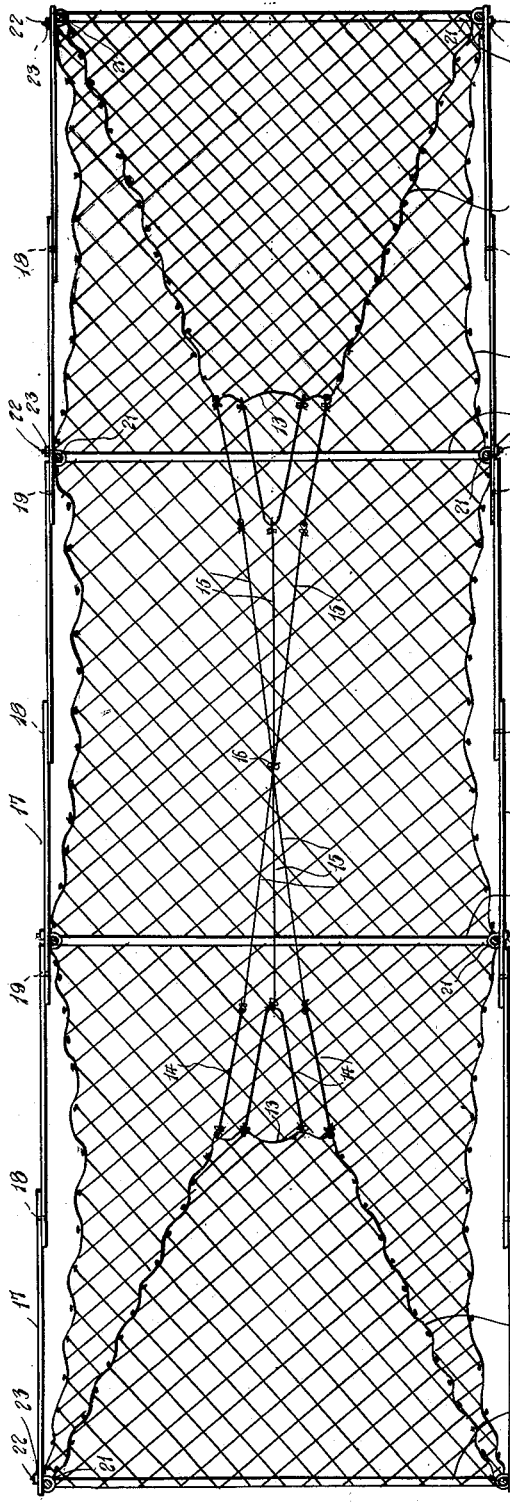
J. T. Lawrence,
Inventor Patented Dec. 18, 1934

1,985,177

UNITED STATES PATENT OFFICE 1,985,177

COLLAPSIBLE FISH BASKET

John T. Lawrence, Inman, S. C.

Application November 10, 1932, Serial No. 642,084

1 Claim. (Cl. 43—100)

The invention relates to trap nets or collapsible fish baskets, and has for its principal object the provision of a trap net comprising an elongated tubular net secured to hoops at spaced intervals and with conical-shaped entrance nets in the two ends of the tubular net that are held distended by means of cords connected with the mouths of the restricted openings of the conical entrance nets, said cords being crossed intermediate of their secured ends to provide baffles for the entrapped fish in the net and prevent their escape therefrom.

A further object of the invention is the provision of a trap net or a collapsible basket employing a tubular net held in distended position by means of spaced hoops, and providing means whereby the hoops are held in spaced relation for setting the trap net, and also provided with means whereby the net may be collapsed for transportation and storage.

A further object of the invention is the provision of a trap net or collapsible basket employing a tubular net secured to spaced hoops for distending it and securing jointed rods to said hoops to permit collapsing of the trap net for transportation and storage.

A further object of the invention is the provision of loop members removably engaging the hoops of a trap net and adjustable on extending rods for holding the hoops in adjusted positions.

The invention will be described in detail hereinafter and will be found illustrated in accompanying drawings in which Figure 1 is a top plan view of the improved collapsible basket or trap net, Figure 2 is a transverse sectional view on a plane indicated by the line 2—2 of Figure 1, Figure 3 is a top plan view showing the collapsible fish basket partly collapsed, Figure 4 is a detail sectional view showing the trap net fragmentarily, taken on a plane indicated by the line 4—4 of Figure 1, Figure 5 is a longitudinal sectional view on the plane indicated by the line 5—5 of Figure 1, Figure 6 is a plan view of a modified construction of means for holding the basket in extended position, and Figure 7 is an end view of the modification shown in Figure 6.

In the drawings similar reference characters are used to designate corresponding parts in all of the views.

The improved collapsible fish basket or trap net as disclosed in Figures 1 to 5 comprises an elongated tubular net 10 that is secured to hoops 11 at spaced intervals to hold the net 10 distended. The ends of the tubular portions of the net are turned inwardly of the end hoops 11 and are conical in shape to provide entrance nets 12, or the entrance nets 12 may be separate from the tubular net 10 and secured to the end hoops 11 as may be preferred.

The conical entrance nets 12 provide a restricted opening 13 at each end of the basket or trap net, and secured to the net material around each of the openings 13 are loops 14 of twine or other flexible material to which are secured cords or other flexible material 15 connecting loops 14 at opposite ends of the net, said loops being crossed intermediate of their secured ends as shown at 16, or drawn together by means of a tie so as to provide restricted exits to baffle the fish within the net in endeavoring to escape therefrom.

To provide for convenient storage and transportation of the fish basket, the hoops 11 have secured thereto jointed rods 17, said rods 17 consisting of a plurality of sections that are hingedly secured together at 18 intermediate of the adjacent hoops 11, and are also jointed as shown at 19 adjacent to the intermediate hoops 11. The joints 19 are provided with spring members 20 to frictionally hold the pivotally engaged sections of the rods 17 in adjusted positions to prevent casual movement of the parts of the rods either when folded or extended.

The rods 17 are secured to the hoops 11 by means of hook members 21 having threaded shanks 22 to receive clamping nuts 23, this construction permitting quickly assembling or dismounting of the rods on the hoops.

In the modification shown in Figures 6 and 7 the hoops 11 are held in spaced relation by means of rods 17' that are secured to the end hoops 11 by tying them as shown at 24, or any other suitable means may be substituted for securing the rods to the end hoops 11, in this form the rods being removed from the hoops when the fish basket or trap net is to be collapsed.

What is claimed is:—

In a collapsible fish basket, a frame comprising spaced hoops and rods secured to said hoops, a tubular net supported on said frame, inwardly extending conical-shaped entrance nets secured to the end hoops of said frame and having restricted substantially circular openings communicating with the interor of the tubular net, U-shaped loops having their extremities secured at spaced distances to the entrance nets adjacent to said openings, and strands of cords, each of said strands terminally connecting a loop on each of the entrance nets and located on opposite sides of the axis of the tubular net, all of said strands crossing intermediate of the entrance nets and secured together at the crossing, said loops and crossed strands of cords being circularly arranged and providing means for entrance of fish into the tubular net and a baffle to prevent escape therefrom.

JOHN T. LAWRENCE.